US012762563B1

(12) United States Patent
Serrao et al.

(10) Patent No.: US 12,762,563 B1
(45) Date of Patent: Oct. 13, 2026

(54) DETECTING FRAUD BASED ON GRATUITY AMOUNTS

(71) Applicant: United Services Automobile Association (USAA), San Antonio, TX (US)

(72) Inventors: Nolan Serrao, Plano, TX (US); David Joaquin Harris, San Antonio, TX (US); Qunying Kou, San Antonio, TX (US); Gideon Bowie Luck, Plano, TX (US); Nickolaus Wayne O'Neal, San Antonio, TX (US); Kristina Suniga-Cabrera, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 30 days.

(21) Appl. No.: 18/415,138

(22) Filed: Jan. 17, 2024

Related U.S. Application Data

(60) Provisional application No. 63/439,497, filed on Jan. 17, 2023.

(51) Int. Cl.
*G06Q 20/20* (2012.01)
*G06Q 20/34* (2012.01)
*G06Q 20/40* (2012.01)
*G06Q 20/42* (2012.01)

(52) U.S. Cl.
CPC ......... *G06Q 20/4016* (2013.01); *G06Q 20/20* (2013.01); *G06Q 20/352* (2013.01); *G06Q 20/40145* (2013.01); *G06Q 20/4015* (2020.05); *G06Q 20/42* (2013.01)

(58) Field of Classification Search
None
See application file for complete search history.

(56) References Cited

U.S. PATENT DOCUMENTS 12,212,681 B1 * 1/2025 Drapeau .............. G06Q 20/085
12,469,089 B1 * 11/2025 Haitz ................. C08G 63/6856
12,505,445 B2 * 12/2025 Burke ................ G06Q 20/4016
2003/0168509 A1 * 9/2003 Nielsen .................. G06Q 20/20
235/379

(Continued)

*Primary Examiner* — William J Jacob
(74) *Attorney, Agent, or Firm* — Fletcher Yoder, P.C.

(57) ABSTRACT

A system includes a point of sale device and a processing system to detect trigger data indicative of a transaction expected to occur within a time period. Furthermore, the processing system is configured to receive a gratuity model associated with a user associated with the transaction in response to detecting the trigger data. The gratuity model is representative of expected gratuity amounts corresponding to transaction types. Additionally, the processing system is configured to receive, from the point of sale device, transaction data including an actual gratuity amount associated with the transaction. The processing system is also configured to determine an expected gratuity amount based on the gratuity model. Further, the processing system is configured to generate an alert indicative of unexpected financial activity in response to the actual gratuity amount deviating from the expected gratuity amount by a threshold amount. The alert is presented via an electronic display.

18 Claims, 3 Drawing Sheets

(56) References Cited

U.S. PATENT DOCUMENTS

| | | | | |
|---|---|---|---|---|
| 2014/0244489 | A1* | 8/2014 | Kessler | G06Q 30/0279 705/39 |
| 2016/0012445 | A1* | 1/2016 | Villa-Real | G06Q 20/4016 705/44 |
| 2017/0132584 | A1* | 5/2017 | Birukov | G06Q 20/12 |
| 2018/0349912 | A1* | 12/2018 | Fiterman | G06Q 20/3221 |
| 2020/0320503 | A1* | 10/2020 | Mell | G06Q 20/204 |
| 2022/0319283 | A1* | 10/2022 | Misra | G06Q 30/0185 |
| 2022/0327186 | A1* | 10/2022 | Tomoda | G06N 3/0499 |
| 2023/0059064 | A1* | 2/2023 | Benkreira | G06Q 20/389 |

* cited by examiner

DETECTING FRAUD BASED ON GRATUITY AMOUNTS

CROSS-REFERENCE TO RELATED APPLICATION

The present application claims priority to and the benefit of U.S. Provisional Application No. 63/439,497, entitled "DETECTING FRAUD BASED ON GRATUITY AMOUNTS" and filed on Jan. 17, 2023, the disclosure of which is incorporated by reference herein in its entirety for all purposes.

BACKGROUND

The present disclosure relates to systems and methods of mitigating fraud. More specifically, the present disclosure relates to detecting unusual gratuity payments based on a model of a user's previous payments in given contexts.

A user may choose to pay a certain amount of money as a gratuity to a vendor. Unfortunately, the gratuity payment may occur via means that are vulnerable to fraud or error. For example, the user may be asked to manually fill in a blank on a receipt to indicate a gratuity amount that she wishes to pay. In some cases, the gratuity amount may be manipulated, misinterpreted, or otherwise charged to the user for an unintended amount. As such, improved systems for monitoring financial activity and mitigating fraud surrounding gratuity payments are desirable.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admission of prior art.

BRIEF DESCRIPTION BRIEF SUMMARY OF THE INVENTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes a point of sale device configured to facilitate a transaction. Additionally, the system includes a processing system configured to detect trigger data indicative of the transaction expected to occur within a time period. The transaction is associated with a user. Furthermore, the processing system is configured to receive a gratuity model associated with the user in response to detecting the trigger data. The gratuity model is representative of expected gratuity amounts corresponding to transaction types. Additionally, the processing system is configured to receive, from the point of sale device, transaction data including an actual gratuity amount associated with the transaction. The processing system is also configured to based on the gratuity model. Further, the processing system is configured to generate an alert indicative of unexpected financial activity in response to the actual gratuity amount deviating from the expected gratuity amount by a threshold amount. The alert is presented via an electronic display.

In another embodiment, a method includes detecting, via a processing system, trigger data indicative of a transaction expected to occur within a time period. The transaction is associated with a user. The method also includes receiving, via the processing system, a gratuity model associated with the user in response to detecting the trigger data. The gratuity model is representative of expected gratuity amounts corresponding to transaction types. Additionally, the method includes receiving, via the processing system, transaction data associated with the transaction. The method further includes determining, via the processing system an actual gratuity amount based on the transaction data and an expected gratuity amount based on the gratuity model. Furthermore, the method includes generating, via the at least one processor, an alert indicative of unexpected financial activity in response to the actual gratuity amount deviating from the expected gratuity amount by a threshold amount. The alert is presented via an electronic display.

In yet another embodiment, one or more non-transitory, computer readable media contain instructions that, when executed by a processing system, cause the processing system to detect trigger data indicative of a transaction expected to occur within a time period. The transaction is associated with a user. The instructions, when executed by the processing system, cause the processing system to receive a gratuity model associated with the user in response to detecting the trigger data. The gratuity model is representative of expected gratuity amounts corresponding to transaction types. The instructions, when executed by the processing system, cause the processing system to receive transaction data associated with the transaction. Additionally, the instructions, when executed by the processing system, cause the processing system to determine an actual gratuity amount based on the transaction data and an expected gratuity amount based on the gratuity model. Furthermore, the instructions, when executed by the processing system, cause the processing system to generate an alert indicative of unexpected financial activity in response to the actual gratuity amount deviating from the expected gratuity amount by a threshold amount. The alert is presented via an electronic display.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
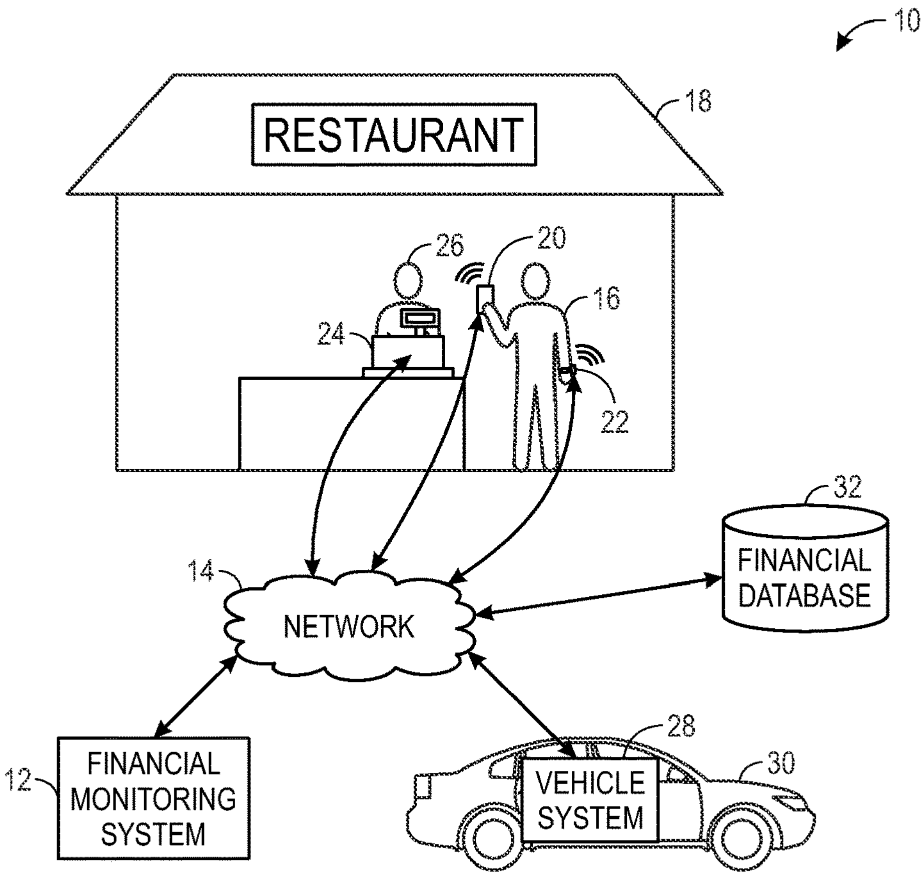
FIG. 1 is a diagram of a system including a variety of computing devices that may provide data to a financial monitoring system in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, systems and methods for detecting potential fraud within payment requests associated with gratuity may help individuals execute more secure payment transactions at certain businesses, such as restaurants, bars, and the like. For example, a customer at a restaurant or other commercial establishment may elect to provide a certain amount of money as a gratuity or tip for any services that they may have received at the commercial establishment. In some cases, the gratuity may be paid using a transaction card (e.g., credit card, debit card, gift card) or an electronic payment system (e.g., Apple Pay). The customer may denote a gratuity amount by manually filling in a blank on a receipt. Unfortunately, this manner of tipping may be vulnerable to error or fraud. For example, a customer may be charged for an unintended tip amount based on a miscalculation or a misreading of a hastily penned tip amount. In another example, a malefactor may fraudulently alter an intended tip amount by overwriting the intended tip amount on the receipt. The erroneous or fraudulent tip amount may be uncharacteristic of the customer or any customer, considering a set of circumstances surrounding the transaction. Therefore, in order to mitigate error or fraud with regard to the gratuity amount, it may be desirable to determine whether a given gratuity amount is anomalous to an expected gratuity amount for the individual.

With this in mind, the present disclosure relates to systems and methods of detecting anomalous tipping behavior based on a gratuity model that accounts for context surrounding a transaction. That is, an expected tip amount may be determined based on multiple factors, such as a user's spending habits, features of the restaurant, telemetry of user-associated devices, and so on. A financial monitoring system may generate a gratuity model based on historical tipping data of the user. The historical tipping data may be collected over a period of time during which the gratuity model may be trained to predict tipping behavior of the user for various scenarios.

Additionally, the historical tipping data may be continually updated as new transactions create new data points for the gratuity model. In any case, the historical tipping data may include user data from various sources including a bank, a mobile device, a digital calendar, a vehicle system, a block chain, a database of restaurants, a transaction card, a search history, a biometric sensor, a location sensor, a microphone, and the like. At least some of the user data may correlate with expected tip amounts. Therefore, the gratuity model may be trained to output an expected tip amount or a range of expected tip amounts that corresponds to user data received from various sources. After the gratuity model is generated, the financial monitoring system may present (e.g., via a mobile app) the gratuity model or aspects of the gratuity model to the user for review via an electronic display. After reviewing the gratuity model, the user may approve, disapprove, or make changes to the gratuity model or to parameters used to generate the gratuity model. Furthermore, as the gratuity model updates over time, the user may view and/or change the gratuity model upon request, after an anomalous trend is detected, or after any suitable event.

The financial monitoring system may then use the gratuity model to detect unauthorized or fraudulent tip amounts. For instance, the financial monitoring system may initiate collecting updated user data for determining a gratuity amount using the gratuity model in response to detecting certain trigger data, such as an action, location, status, scheduled action, or message of a user or a device associated with the user. In one instance, the trigger data may include the user's calendar noting that a dinner reservation is scheduled within a threshold amount of time. After detecting the trigger data, the financial monitoring system may collect data (e.g., updated user data) that may be related to the user data used to generate the gratuity model.

In some embodiments, the financial monitoring system may receive a request to pay an invoice after collecting the updated user data. The invoice may include an amount for the products and services purchased by the individual and a gratuity amount. The gratuity amount may be provided by the individual at the individual's discretion. As mentioned above, the invoice may have been provided with a paper receipt, which can be modified, misread, or misinterpreted to incorrectly charge the individual for a gratuity amount that is different from what the individual intended to pay.

With this in mind, the financial monitoring system may receive the requested payment amount and determine whether the gratuity portion of the invoice corresponds to an expected gratuity amount provided by the gratuity model using the updated user data. That is, the financial monitoring system may determine an expected gratuity amount that the individual is expected to pay based on various user data sources such as biometric data, location data, time data, and the like. If the charged gratuity amount exceeds the expected gratuity amount by some threshold, the financial monitoring system may generate an alert and present the alert via a visual feedback, audio feedback, haptic feedback, or the like. The alert may request confirmation from the user indicating that the charged gratuity amount is correct. In some embodiments, the financial monitoring system may send a command to a financial entity associated with the user. The command may obstruct the payment or otherwise mitigate financial loss to the user. Additional details with regard to verifying the authenticity of a gratuity amount will be described below with reference to FIGS. 1-4.

By way of introduction, FIG. 1 illustrates a diagram of a system (e.g., a restaurant environment) 10 that includes a variety of data sources and computing devices to assist a financial monitoring system 12, according to an embodiment of the present disclosure. Referring to FIG. 1, the system 10 may include a network 14 that may transmit and receive user data between the variety of data sources and computing devices and the financial monitoring system 12. As will be discussed in greater detail below, the user data may include financial activity of a user 16 and other user data that may influence the financial activity. The financial monitoring system 12 may process the user data to detect fraud and implement security measures. In particular, the financial monitoring system 12 may monitor the user data as it relates to gratuity payments, such as for services rendered at a commercial establishment (e.g., a restaurant or bar) 18. For example, the financial monitoring system 12 may receive the user data, generate a model of tipping behavior of the user, and detect unusual tipping behavior.

In some embodiments, the financial monitoring system 12 may be associated with an enterprise computing system a (e.g., server, cloud-based service) connected to the network 14. Additionally, the enterprise computing system may orchestrate tasks across the network, including querying the data sources for the user data, managing data flows between elements of the system 10, commanding client devices to perform certain actions, and coordinating communication between the client devices. In other embodiments, the financial monitoring system 12 may be implemented as a software application on a mobile device 20 or on another computing device associated with the user 16. In any case, the financial monitoring system 12 may monitor financial activity of the user 16 and detect unusual transactions by analyzing the user data.

The network 14 may receive the user data from one or more data sources or computing devices of the system 10. For example, the network 14 may receive the user data including mobile device data from a mobile device (e.g., smartphone) 20 associated with the user 16. The mobile device data may include data collected by or stored on the mobile device 20, such as location data, calendar data, biometric data, internet activity data, and the like. In some embodiments, one or more user accounts may be associated with the mobile device 20, and the collected data may be associated with the user account. Moreover, the mobile device 20 may aggregate the user data from a variety of data sources (e.g., one of the other computing devices) and transmit the user data to the network 14. In some instances, the mobile device 20 may receive an indication (e.g., an alert, a notification, a prompt, a command, and the like) generated by the financial monitoring system 12, via the network 14. The mobile device 20 and the other components shown in FIG. 1 may communicate via the network 14 using one or more wired or wireless communication protocols, such as cellular 4G, 5G, Wi-Fi, BLUETOOTH®, radio-frequency identification (RFID), and the like.

In similar fashion, the network 14 may receive the user data including additional user device data from one or more additional user devices, such as a smart watch 22, a smart wallet, a headset, and the like. In the illustrated embodiment, the user 16 wears the smart watch 22 which may include smart watch sensors, such as a biometric sensor, a location sensor, an accelerometer, a gyroscope, and the like. One of the additional user devices may be paired to another of the additional user devices or the mobile device 20. For example, the smartwatch 22 may be paired to the mobile device 20 via BLUETOOTH®. In this way, the mobile device data of the mobile device 20 may be correlated in substantially real-time with the additional user device data of the additional user device.

The user 16 may initiate a transaction via a point of sale device 24. The commercial establishment 18 may be a restaurant, bar, salon, car wash, taxi, or any entity party to a transaction with the user 16. In accordance with FIG. 1, the network 14 may receive point-of-sale (POS) data, including an invoice, from a point-of-sale device (POS) 24 of the commercial establishment 18. The POS device 24 may be any device used at a point of sale, such as a credit card terminal, a mobile POS device, a self-service kiosk, and the like. The user 16 may be asked to pay via the point of sale device 24 by swiping, inserting, tapping, scanning, or otherwise presenting a transaction card (e.g., credit card, debit card, and the like). In some embodiments, the POS device 24 may present, via a display (e.g., touch screen display), a prompt asking the user 16 to select or enter a gratuity amount (e.g., $3, 15%, $0) to pay. The user may choose the gratuity amount from a set of predetermined options, or the user may manually input the gratuity amount via a user interface (e.g., digital keypad) of the point of sale device 24.

The POS 24 may generate the invoice for the transaction. The invoice may include line items, the gratuity amount, a sub-total payment amount, a total payment amount, and the like. The POS device 24 may generate a visualization of the invoice to the user 16 via the display, send the invoice to the mobile device 20 or the smart watch 22, or print the invoice as a physical receipt. In any case, an invoice may be generated to document the transaction for later review, verification, and analysis. In addition to the invoice, the point-of-sale data may include metadata associated with the transaction, such as a time stamp, a device identifier, a purchase category, and the like. In addition to receiving the POS data from the POS device 24, the network 14 may receive the invoice from the mobile device 20, the smart watch 22, or another suitable device.

In some embodiments, personnel 26 (e.g., waiter, server, bartender, cashier, and the like) of the commercial establishment 18 may perform the transaction using the user's 16 transaction card. For example, the user 16 may receive a printed invoice for the transaction, such that the printed invoice includes a blank where the user 16 may sign a signature and write the gratuity amount which she wishes to pay. Then, the user 16 may provide the transaction card to the personnel 26 along with the signed printed invoice. The personnel 26 may conduct the payment using the transaction card via the point of sale device 24, taking into account the gratuity amount indicated by the user 16 on the signed printed invoice. Unfortunately, the written gratuity amount may be altered (e.g., tampered) in the time between the user 16 signing the printed invoice and the personnel 26 entering the payment in the point of sale device 24. Additionally, the personnel may misinterpret or mistype the gratuity amount and thereby charge the user 16 for an unintended amount.

In another aspect of FIG. 1, the network 14 may further receive the user data including vehicle data from a vehicle system 28 associated with the user 16. The vehicle system 28 may be disposed within a vehicle 30. The vehicle system 28 may include an electronic control unit (ECU) that controls one or more electrical systems in the vehicle 30. The ECU may be communicatively coupled to a variety of vehicle sensors (e.g., air pressure sensors, engine temperature sensors, passenger detection sensors, and the like) which provide the vehicle data to the vehicle system 28. The vehicle data may also include GPS data, route navigation data, auxiliary device data, telemetry data, and the like. In this way, the vehicle data may indicate when certain events occur, such as ignition, route-planning, arrival to a planned destination, and the like. The vehicle system 28 may communicate with the network 14 and/or the mobile device 20 via the wired connection or the wireless communication protocol, as discussed above.

The system 10 may further include a financial database 32, which may store information received or generated by the system 10, including the user data. For example, the financial database 32 may receive the user data collected by the mobile device 20 the network 14 and store the received user data in a storage device. Additionally, the financial database 32 may include financial data related to the user 16, such as bank account numbers, transaction card data, account balances, transaction histories, and the like. In some cases, the financial database 32 may be updated in substantially real-time as the system generates or receives new data. Information stored in the financial database 32 may be retrieved (e.g., queried) continuously, continually, or on demand by the financial monitoring system 12 for review, processing, or analysis. Furthermore, the financial monitoring system 12 may generate results of the analysis (e.g., processed user data, a model, a flagged data point, an authorization, a prediction, a recommended gratuity amount, and the like), and the financial database 32 may receive and store these results. The results may be available for further analysis or review by the financial monitoring system 12, the mobile device 20, or another suitable device. In some embodiments, the financial database 32 may be part of a same computing system as the financial monitoring system 12, such as the enterprise computing system. That is, components (e.g., processor, memory) of the same computing system may perform the operations of both the financial monitoring system 12 and the financial database 32.

As they relate to the present disclosure, the nature of the data and means of collecting data are not particularly limited. For example, additional data sources not depicted may include a satellite, a camera, a device of another user, a social media feed, online restaurant reviews, and the like. The network 14 may receive additional data from these additional data sources and store the additional data in the financial database 32 or one or more other databases accessible to the financial monitoring system 12. The financial monitoring system 12 may then use the collected data for analysis in accordance with the embodiments presented herein.

Figure 2:
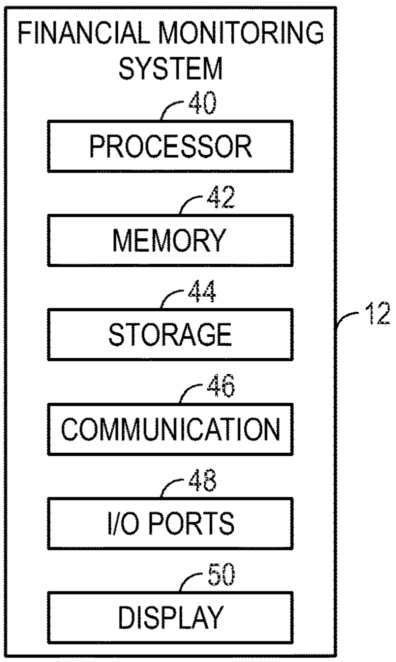
FIG. 2 is a block diagram of example components within the financial monitoring system, in accordance with aspects of the present disclosure.

Before describing the analysis operations, FIG. 2 is a block diagram of example components that may be part of the financial monitoring system 12, according to an embodiment of the present disclosure. Although the following description details some example components that make up the financial monitoring system 12, it should be understood that the financial monitoring system 12 may include additional or fewer components.

Referring now to FIG. 2, the financial monitoring system 12 may include a processor 40, a memory 42, a storage 44, a communication component 46, input/output (I/O) ports 48, a display 50, and the like. The processor 40 may be any type of computer processor or microprocessor capable of executing computer-executable code. The processor 40 may also include multiple processors that may perform the operations described below.

The memory 42 and storage 44 may be any suitable articles of manufacture that can serve as media to store processor-executable code, data or the like. These articles of manufacture may represent computer-readable media (e.g., any suitable form of memory or storage) that may store the processor-executable code used by the processor 40 to perform the presently disclosed techniques. As used herein, applications may include any suitable computer software or program that may be installed onto the financial monitoring system 12 and executed by the processor 40. The memory 42 and the storage 44 may represent non-transitory computer-readable media (e.g., any suitable form of memory or storage) that may store the processor-executable code used by the processor 40 to perform various techniques described herein. It should be noted that non-transitory merely indicates that the media is tangible and not a signal.

The communication component 46 may be a wireless or wired communication component that may facilitate communication between various components of the system 10, such as the financial monitoring system 12, the mobile device 20, the financial database 32, and various other computing systems via the network 14, the Internet, or the like. Additionally, the communication component may 46 may facilitate data transfer to the financial monitoring system 12, such that the financial monitoring system 12 may receive data from the other components depicted in FIG. 1 and the like.

The I/O ports 48 may be interfaces that may couple to other peripheral components such as input devices (e.g., keyboard, laser scanner, mouse, microphone), sensors, input/output (I/O) modules, and the like. The display 50 may depict visualizations associated with software or executable code being processed by the processor 40. In one embodiment, the display 50 may be a touch display capable of receiving inputs from a user of the financial monitoring system 12. The display 48 may be any suitable type of display, such as a liquid crystal display (LCD), plasma display, or an organic light emitting diode (OLED) display, for example. Additionally, in one embodiment, the display 50 may be provided in conjunction with a touch-sensitive mechanism (e.g., a touch screen) that may function as part of a control interface for the financial monitoring system 12.

Figure 3:
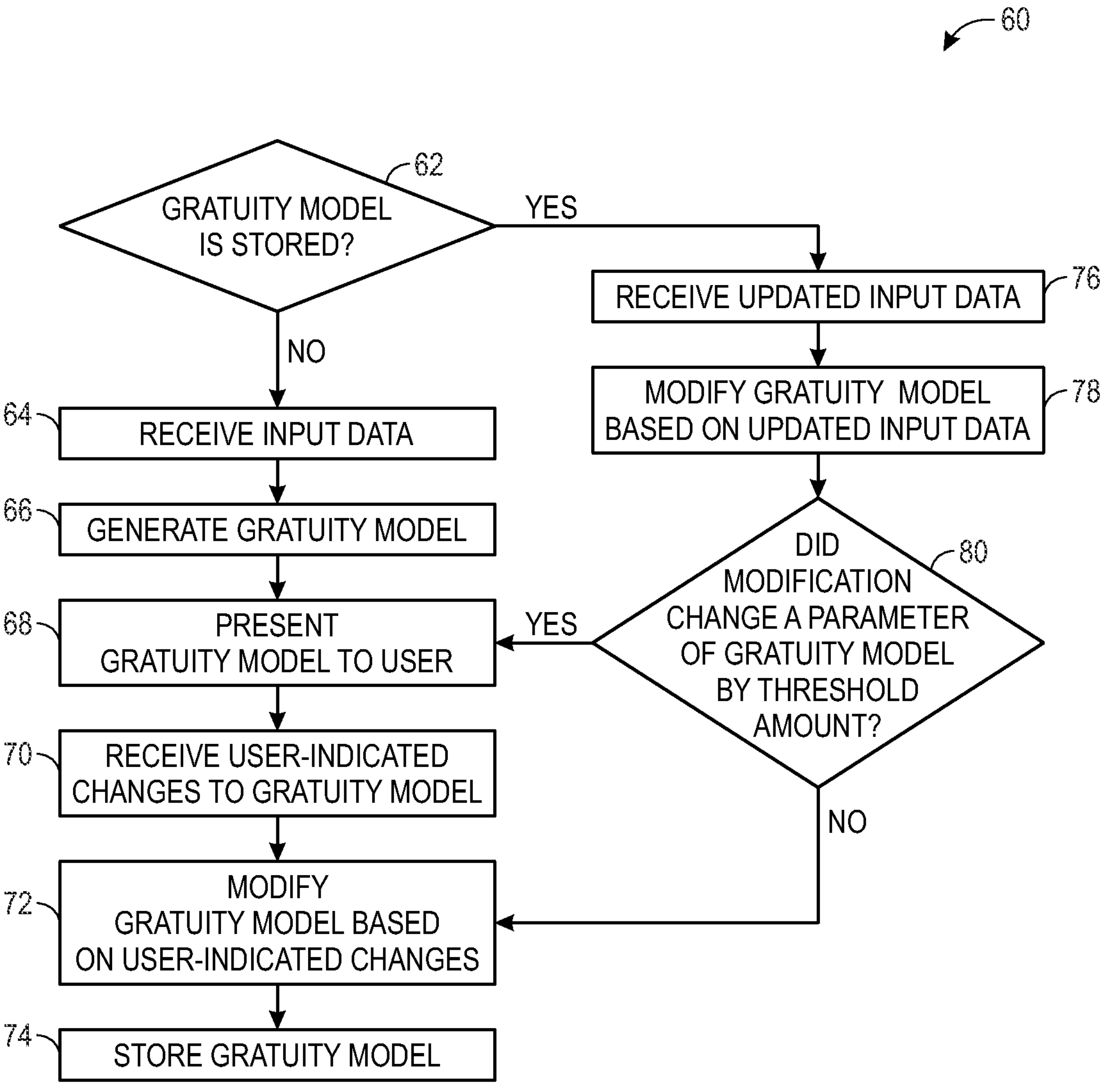
FIG. 3 is a flowchart of a method for generating and updating a gratuity model, in accordance with aspects of the present disclosure.

Keeping this in mind, FIG. 3 illustrates a flowchart of a method 60 for creating and updating a gratuity model of the user 16 based on historical tipping data. That is, the method 60 involves receiving input data indicative of the user's 16 behavior and contexts, generating the gratuity model based on the input data, presenting the gratuity model to the user for review, receiving user feedback for the gratuity model, modifying the gratuity model according to the feedback, and storing the gratuity model. After the gratuity model is stored, the method 60 may include receiving updated input data indicative of new behavior and contexts of the user 16 and updating the gratuity model accordingly. Although the following description of the method 60 is described in a particular order, it should be noted that the method 60 may be performed in any suitable order. Additionally, although the method 60 is described as being performed by the financial monitoring system 12, it should be understood that any suitable computing system (e.g., the mobile device 20, the smart watch 22, and the like) may perform the method 60.

Referring now to FIG. 3, at block 62, the financial monitoring system 12 may determine whether a gratuity model of the user 16 is available. For example, the financial monitoring system 12 may perform a search of the financial database 32 to find a gratuity model associated with the user 16. The financial monitoring system 12 may also find a pointer or metadata indicating that the gratuity model associated with the user 16 exists. In addition, the gratuity model, if it exists, may be stored in the storage 44 of the financial monitoring system 12, the mobile device 20, the enterprise computing system, or any other data source connected to the network 14. The gratuity model may be stored as a data structure, a readable file, an executable file, and the like.

As mentioned above, the gratuity model may provide an expected tip amount or a range of expected tip amounts that corresponds to various locations, scenarios, or the like. That is, based on the data collected from the sources described above, the gratuity model may provide an expected gratuity amount for a combination of observations or collected data points. That is, the gratuity model may provide an output of an expected gratuity amount based on previously detected data points as will be detailed below with reference.

In any case, the financial monitoring system 12 may determine whether the gratuity model of the user 16 is stored and retrievable from any data storage system connected to the network 14. If the financial monitoring system 12 determines that a gratuity model for the user 16 is unavailable, the financial monitoring system 12 may proceed to block 64.

At block 64, the financial monitoring system 12 may receive input data that will be used to generate the gratuity model. As mentioned above, the input data may include any user data associated with the user 16, as well as contextual data relating to situations, locations, periods of time, other people, and the like. In particular, the input data may relate to payments made by the user 16, including gratuity payments. In some embodiments, the financial monitoring system 12 may transmit a request to the financial database 32 for any input data stored therein. That is, the input data may have been previously gathered via the computing devices of the system 10 and stored in the financial database 32 for subsequent retrieval by the financial monitoring system 12. Additionally or alternatively, the financial monitoring system 12 may receive the input data from the other computing devices connected to the network 14, such as the mobile device 20. For example, the financial monitoring system 12 may receive the location data, financial activity data (e.g., purchases), activity (e.g., steps), health data (e.g., heart rate), and other mobile device data from the mobile device 20. In addition, the additional user device data from the smart watch 22 may provide similar information. Further, the POS data from the POS device 24 may include invoice data, date and time data, location data, and the like. In the same manner, the input data may include the vehicle data from the vehicle system 28. It should be noted that, in some embodiments, the financial monitoring system 12 may receive at least some of the input data in substantially real-time.

In one example, the financial monitoring system 12 may receive a transaction history from the financial database 32. The transaction history may include a list of payments previously performed by the user 16, such as payments which include gratuity. Gratuity payments may be recorded in the transaction history independently or in association with respective total payments. In some embodiments, the financial monitoring system 12 may receive, via the network 14, payment information from the POS device 24 and add the payment information to the transaction history in the financial database 32 or the storage 44 of the financial monitoring system 12. The transaction history may also include metadata related to the payments, such as timestamps, dates, locations, payment methods, transaction card information, restaurant information, and the like.

In another example, the input data may include other user data and contextual data relating directly and indirectly to gratuity payments of the user. As mentioned above, the financial monitoring system 12 may receive the mobile device data from the mobile device 20 or the financial database 32. The mobile device data may include any data collected, generated, or stored using the mobile device 20. For example, the mobile device 20 may generate location data, such as a location history. The financial monitoring system 12 may receive at least a portion of the location data corresponding to a certain event or period of time (e.g., during typical lunch times, 12 hours prior to a payment). In some embodiments, the mobile device data may include calendar data indicative of certain events, such as a dinner reservation, invitees thereof, locations thereof, and the like. Furthermore, the mobile device data may include biometric data, such as physical activity data (e.g., steps taken, calories burned), blood pressure, fingerprint profiles, and the like.

In some embodiments, the mobile device data may include data aggregated from a variety of sources, including the smart watch 22, user accounts of web services, internet browsing histories, satellites, and the like. As such, the nature of the input data is not particularly limited by the present disclosure. For example, the input data may further include any data collected from the smart watch 22, the POS device 24, the vehicle system 28, restaurant websites, financial institutions, weather monitoring systems, user data of other users, and the like, as discussed above in the description of FIG. 1. Any of these input data may correlate to the user's tipping behavior and/or contribute to generating the gratuity model. Any of these input data may be received by the financial monitoring system 12 in substantially real-time or as a batch. For example, the financial monitoring system 12 may continuously, continually, or altogether receive the input data for a certain period of time or until a condition is met, such as determining that a payment has been made, that the user 16 has left the commercial establishment 18, and the like.

The input data may also include proximity data related to a distance between the user 16 and a transaction card. In one embodiment, the user 16 may carry a card-tracking device (e.g., RFID reader) that may track a location, distance, and/or presence of the transaction card. For example, the card-tracking device may be included in the mobile device 20, the smart watch 22, a wallet, a pocket, an article of clothing, or another object that the user 16 regularly carries in a certain proximity to the transaction card. The card-tracking device may employ any suitable wireless communication protocol to detect, locate, and/or identify the transaction card, such as RFID, near-field communication (NFC), BLUETOOTH®, Wi-Fi, GPS, 5G, and the like. For example, the user 16 may carry a credit card having an RFID tag in a smart wallet having an RFID reader. Alternatively, the mobile device 20 may include an RFID reader, and the credit card may be stored in a phone wallet coupled to the mobile device 20.

The RFID reader may continually or continuously transmit interrogator signals. If the credit card is within a threshold proximity to the RFID reader, then the RFID tag may transmit an authentication reply to the RFID reader in response to receiving the interrogator signal. Upon receiving the authentication reply, the RFID reader may verify that the RFID tag corresponds to the transaction card by comparing a signature of the authentication reply to a known identifier of the RFID tag. The financial monitoring system 12 may determine a time and duration that the transaction card is in or out of range of the RFID reader based on signals transmitted therebetween. For example, if the RFID reader transmits an interrogator signal at 10 second intervals, the financial monitoring system 12 may expect the RFID reader to receive an authentication reply signal every 10 seconds, indicating that the transaction card is within the threshold proximity of the RFID reader. If the RFID reader does not receive the authentication reply signal in response to the interrogator signal, then the financial monitoring system 12 may determine that the transaction card has been removed from the threshold proximity (e.g., removed from the smart wallet). Additionally, the financial monitoring system 12 may track a duration of separation for which the transaction card is outside the threshold proximity. This duration, for example, may be relevant input data to the gratuity model. That is, the financial monitoring system 12 may detect a trend wherein the duration of separation is correlated to gratuity amounts.

In another aspect of block 64, the input data may include purchase data of items during a period in which the user 16 has an open tab (e.g., at a bar). In order to keep the user 16 informed of the tab, the financial monitoring system 12 may generate an alert to the user (e.g., via the mobile device 20) indicating each additional item on the tab as the item is purchased. In some embodiments, the user 16 may be asked to confirm a purchase of the item in order to ensure that the transactions are authorized. That is, the point-of-sale device 24 may receive an input indicative of items added to an open tab and may send a notification that may cause the user device 20 to automatically present an alert (e.g., visual, audible, haptic) indicative of the addition. Additionally, the items may be recorded with timestamps, such that the financial monitoring system 12 may present to the user a record of purchases made on the tab. The financial monitoring system 12 may present the record of purchases in a visualization via the mobile device 20, such that the user 16 may look back on the purchases in order to reminisce or recall an otherwise blurry event.

After receiving the input data, the financial monitoring system 12 may proceed to block 66. At block 66, the financial monitoring system 12 may generate the gratuity model based on the input data received at block 64. That is, the financial monitoring system 12 may analyze the input data to determine correlations, patterns, functions, and other relationships between features of the input data and the resulting gratuity amount. As such, the gratuity model may be any combination of statistical models, machine learning models (e.g., regression, classification, neural network, deep learning, decision tree, and the like), analytical models, rule-based models, lookup tables, and/or any other suitable model. Accordingly, the gratuity model may be trained to predict an expected gratuity payment or an expected range of gratuity payment based on at least some portions of the input data. By way of example, the amount of time spent at a particular location may be directly related to an amount of the gratuity amount. In the same manner, the particular location of the mobile device 20 may also directly affect the gratuity amount. That is, if the location of the mobile device 20 corresponds to businesses or properties that are valued above some threshold, the gratuity amount or percentage to the entire invoice may be higher than when the mobile device 20 is located at other businesses.

Additionally, the financial monitoring system 12 may be trained to predict expected card proximity data during certain time periods based on the input data (e.g., via a card proximity model). After the financial monitoring system 12 generates the gratuity model and/or the card proximity model, the financial monitoring system 12 may proceed to block 68.

At block 68, the financial monitoring system 12 may present the gratuity model, aspects of the gratuity model, or data representative of the gratuity model to the user 16 for review. That is, the user 16 may have an opportunity to check the gratuity model for desired parameters and configurations before approving the gratuity model. For example, the financial monitoring system 12 may generate a visualization of the gratuity model to be displayed on an electronic display of the mobile device 20 via a mobile app. The visualization may include graphs, charts, diagrams, and the like to demonstrate certain aspects of the gratuity model, such as expected ranges of gratuity payment in different contexts. The visualization may also provide results of the analysis of the input data, such as a distribution of the user's past gratuity payments across different businesses, types of businesses, and the like. The financial monitoring system 12 may present the visualization as part of a graphical user interface (GUI) having interactive digital elements configured to receive inputs, provide feedback, enable user interaction with the visualization, and the like.

At block 70, the financial monitoring system 12 may receive (e.g., via the GUI or other user input) an indication of one or more changes to be made to the gratuity model. That is, the user 16, upon reviewing the gratuity model in block 68, may want to modify the gratuity model. For example, the user 16 may want to set or adjust a fixed gratuity limit on payments below a certain amount. Then, the financial monitoring system 12 may receive, via the GUI, a set of user inputs defining the desired change(s). Additionally, at block 70, the user 16 may disapprove the gratuity model entirely, and the financial monitoring system 12 may disregard the generated gratuity model.

At block 72, the financial monitoring system 12 may modify the gratuity model in accordance with the user-indicated changes received at block 70. In some embodiments, the financial monitoring system 12 may incrementally adjust the gratuity model, such as by adjusting a parameter of a regression or enacting a rule. In other embodiments, the gratuity model may be at least partially retrained, taking into account the user-indicated changes. In any case, block 72 may produce an updated gratuity model which improves upon the previous gratuity model with respect to the user's needs.

At block 74, the financial monitoring system 12 may store the gratuity model in a suitable format or structure on a suitable storage device, such as the financial database 32, the storage 44, the mobile device 20, the enterprise computing system, and the like. The gratuity model may be stored such that the gratuity model or aspects thereof are retrievable to be utilized, updated, and/or reviewed. Referring back to block 62, the financial monitoring system 12 may determine that the gratuity model is stored based on having stored the gratuity model at block 74.

Referring back to block 62, if the financial monitoring system 12 determines that the gratuity model is available (e.g., stored in the financial database 32), the financial monitoring system 12 may proceed to block 76. At block 76, the financial monitoring system 12 may receive updated input data in a fashion similar to receiving the input data at block 64. That is, the financial monitoring system 12 may receive the updated input data from the financial database 32 and/or any of the devices connected to the network 14. The updated input data, having new information pertinent to the gratuity model, may supply the financial monitoring system 12 with more relevant intelligence over time. For example, the updated input data may include additional data associated with additional transactions performed after the gratuity model was stored (e.g., at block 74). The additional data may include additional gratuity amounts and additional user data (e.g., calendar data, biometric data, location data, internet history) associated with the additional transactions. The updated input data may be combined with the input data to form a larger dataset on which the gratuity model may be trained or updated. In some embodiments, the financial monitoring system 12 may receive the updated input data continuously, continually, and/or in response to certain conditions, such as detecting an unexpected gratuity payment.

After receiving the updated input data, the financial monitoring system 12 may proceed to block 78.

At block 78, the financial monitoring system 12 may modify the gratuity model based on the updated input data. That is, the gratuity model may be at least partially retrained or otherwise adjusted based on the input data and the updated input data. In this way, the gratuity model may be maintained based on the new information. In some embodiments, the updated input data may be weighted differently than the input data. For example, the financial monitoring system 12 may consider newer information of the updated input data to be more relevant (e.g., weighed higher) than data points of the input data.

At block 80, the financial monitoring system 12 may determine whether modifications made to one or more parameters or other aspect of the gratuity model are greater than a threshold amount. If the modification would change gratuity model or parameters (e.g., gratuity amounts for similar conditions) by a threshold amount, then the financial monitoring system 12 may perform blocks 68, 70, 72, and 74 as delineated above. Otherwise, the financial monitoring system 12 may proceed to block 74, at which the gratuity model, having been modified based on the updated input data, may be stored (e.g., in the financial database 32).

Figure 4:
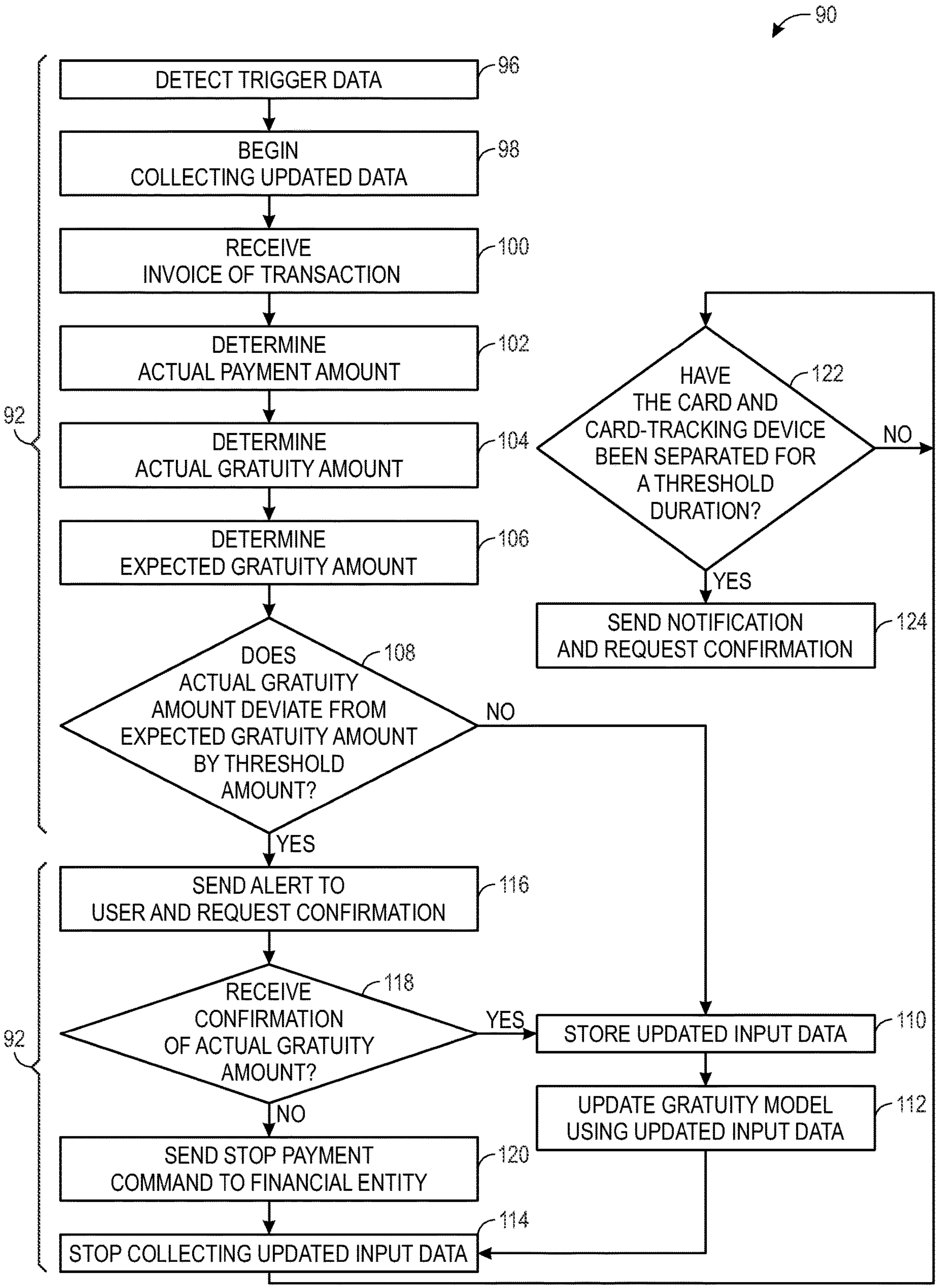
FIG. 4 is a flowchart of a method for detecting unexpected tipping behavior using the gratuity model, in accordance with aspects of the present disclosure.

With the foregoing in mind, FIG. 4 illustrates a flow chart of a method 90 for detecting an unexpected gratuity payment based on the gratuity model generated by the method 60 shown in FIG. 3. That is, the method 90 may be performed assuming that the gratuity model exists. In the illustrated embodiment, the method 90 includes an anomaly detection process 92 including collecting updated input data in response to detecting trigger data, receiving an invoice of a transaction, determining an expected gratuity amount based on the invoice and the gratuity model, and determining whether an actual gratuity amount conforms to the expected gratuity amount. Additionally, the method 90 includes an alert protocol 94 in response to detecting the unexpected gratuity payment.

As mentioned above with reference to FIG. 3, although the following description of the method 90 is described as being performed in a particular order via the financial monitoring system 12, it should be understood that the method 90 may be performed in any suitable order and by any suitable computing device, such as the mobile device 20.

Referring now to FIG. 4, at blocks 96 and 98, the financial monitoring system 12 may begin collecting the updated input data in response to detecting trigger data. The trigger data may be any data received by the financial monitoring system 12 that indicates an event or situation prognosticating useful updated input data. For example, the trigger data may include data indicating that the vehicle 30 started within a certain temporal proximity to a dinner reservation recorded in the user's calendar. The trigger data may further include certain search terms entered into a route navigation application of the mobile device 20 or the vehicle system 28. The trigger data may also include biometric data, such as an indication that the user's blood sugar level is below a certain threshold. That is, the trigger data may be any data that indicates that the user 16 is likely to soon patronize a commercial establishment having a tipping institution. In some embodiments, the financial monitoring system 12 may passively receive the updated input data in order to detect the trigger data in the updated input data. Then, upon detecting the trigger data, the financial monitoring system may begin actively recording the updated input data to be used in the anomaly detection process. In any case, the financial monitoring system 12 may collect updated input data and proceed to block 100.

The updated input data is new data to be used as an input to the gratuity model, which may be trained based on the input data at block 66 of FIG. 3. Accordingly, the updated input data may include data features that correspond to features of the input data. Likewise, collecting the updated input data may involve processes similar to receiving the input data at block 64. For example, if the input data includes the vehicle data as mentioned above, then the financial monitoring system 12, upon detecting the trigger data, may begin collecting the updated input data including updated vehicle data. That is, any form, feature, or type of information (e.g., card proximity data, mobile device data, biometric data, location data, and the like) included in the input data may also be included in the updated input data.

While the financial monitoring system 12 collects the updated input data, the user 16 may perform a transaction via the POS device 24 of the commercial establishment 18 using a transaction card or an electronic payment method. Proceeding now to blocks 100 and 102, the financial monitoring system 12 may receive an invoice, receipt, bill, or other suitable artifact documenting the transaction, such that the financial monitoring system 12 can determine a payment amount associated with the transaction. For example, the POS device 24 may transmit the invoice to the financial monitoring system 12, via the network 14. Alternatively, the user 16 may take a picture of the invoice (e.g., paper invoice) and transmit the picture to the financial monitoring system 12, via the mobile device 20. In any case, the financial monitoring system 12 receives information including an actual payment amount and/or an actual gratuity amount.

At block 104, the financial monitoring system 12 may determine an actual gratuity amount that was paid or will be paid by the user 16. In some cases, the actual gratuity amount may be indicated in the invoice based on optical character recognition (OCR) technology or any other suitable technology. Otherwise, the invoice may include a subtotal payment amount and a total payment amount, and the financial monitoring system 12 may derive the actual gratuity amount paid by the user 16 (e.g., by subtracting the subtotal payment amount from the total payment amount after sales tax). In any case, the financial monitoring system 12 may determine an amount that the user 16 paid in gratuity based on the invoice received at block 100 and/or the payment amount determined at block 102.

At block 106, the financial monitoring system 12 may determine an expected gratuity amount or an expected range of gratuity amount, based on the gratuity model and the updated input data. That is, the gratuity model may output (e.g., predict) the expected gratuity amount using the updated input data and the received information about the transaction. By way of a non-limiting example, the financial monitoring system 12 may receive the invoice indicating a purchase of a $10 item. The updated input data may indicate that the time is 7:30 pm, the commercial establishment 18 has 3 stars according to a popular restaurant review website, and the user 16 experienced decreasing blood pressure levels in the preceding hour. Using at least some of this information as an input to the gratuity model, the financial monitoring system 12 may predict an expected gratuity amount between $2 and $3. Then, the financial monitoring system 12 may determine whether the actual gratuity amount conforms to the expected gratuity amount.

At block 108, the financial monitoring system 12 may determine whether the actual gratuity amount is unexpected.

That is, the financial monitoring system 12 may determine whether the actual gratuity amount deviates from the expected gratuity amount by a threshold amount (e.g., $0, $5, 10%). The threshold amount may be a pre-determined parameter of the gratuity model or the financial monitoring system 12, or the threshold amount may dynamically adjust based on the updated input data. In any case, the financial monitoring system 12 may produce, at block 108, a determination of whether an unexpected gratuity amount was paid. In some embodiments, at block 108, the financial monitoring system 12 may determine whether the updated card proximity data deviates from the expected card proximity data by another threshold amount. That is, the financial monitoring system 12 may determine whether the transaction is suspicious based on the duration of separation of the transaction card from the card-tracking device or other card proximity data generated by processes at block 64, as discussed above. In any case, the financial monitoring system 12 may determine, at block 108, that some aspect (e.g., the actual gratuity amount, the updated card proximity data) of the updated input data is anomalous. If the actual gratuity amount and/or the updated card proximity data are consistent with expectations of the model, then the financial monitoring system 12 may proceed to block 110. Conversely, if the actual gratuity amount and/or the updated card proximity data deviate from the expectations by respective threshold amounts, then the financial monitoring system 12 may continue to block 116.

If the financial monitoring system 12 determines, at block 108, that the actual gratuity amount does not deviate from the expected gratuity amount by the threshold amount, the financial monitoring system 12 may store the updated input data at block 110 and update the gratuity model using the updated input data at block 112, similarly to block 78 of FIG. 3. Then, the financial monitoring system 12 may stop collecting the updated input data. In other words, the transaction does not include an unexpected gratuity payment, so the payment is authorized, and the updated input data is used to update the gratuity model.

If the financial monitoring system 12 determines, at block 108, that the actual gratuity amount deviates from the expected gratuity amount by the threshold amount, then the process 90 may enter the alert protocol 94, whereby the financial monitoring system 12 may perform mitigating measures against potential fraud.

With this in mind, at block 116, the financial monitoring system 12 may send an alert to the user 16 (e.g., via the mobile device 20), notifying the user of unusual activity relating to the transaction. The alert may include a graphical component as well as a haptic (e.g., vibration) component in order to convey urgency. In some embodiments, the financial monitoring system 12 may automatically open, via the mobile application, a user interface on the mobile device 20, the smart watch 22, or another suitable device. The alert, when received by a respective device, may cause the device to automatically execute an application or program regardless of whether the application or program was currently active. In this way, the application or program may provide a visual, haptic, audible, or other suitable alerts that may allow a respective user to become aware of the unusual activity. Additionally, the financial monitoring system 12 may prompt, via the user interface, the user 16 to confirm the transaction and thereby indicate that the payment is authorized. The financial monitoring system 12 may wait a pre-determined amount of time for confirmation from the user 16 before proceeding to block 118.

If, at block 118, the financial monitoring system 12 has received the confirmation, then the financial monitoring system 12 may proceed to blocks 110, 112, and 114 to store the updated input data, update the gratuity model based on the updated input data, and stop collecting the update input data. In some embodiments, the alert and/or confirmation may be included in the updated input data to provide greater context to the transaction with respect to updating the gratuity model. In this way, the gratuity model may be less likely to generate similar false positive alerts in the future.

Conversely, if, at block 118, the financial monitoring system 12 has not received the confirmation, or the financial monitoring system 12 has received a disconfirmation, the financial monitoring system 12 may proceed to block 120. At block 120, the financial monitoring system 12 may send a command to a financial entity associated with the transaction, the commercial establishment 18, the POS device 24, the transaction card, or the user 16. The command may cause the financial entity to abort the payment, flag the transaction for review, freeze an account, file a fraud claim, and/or perform any suitable fraud mitigation techniques. In some embodiments, the financial monitoring system 12 may proceed to blocks 110 and 112 to update the gratuity model with the updated input data. In any case, the financial monitoring system 12 may stop collecting the updated input data at block 114.

At block 122, the financial monitoring system 12 may determine whether a duration of separation between the transaction card and the card-tracking device (e.g., smart wallet, mobile device 20) exceeds a threshold duration. That is, the card-tracking device may ping (e.g., via RFID) the transaction card to determine whether and for how long the transaction card is within or out of a certain proximity of the card-tracking device. If the duration of separation does not exceed the threshold duration, then the financial monitoring system 12 may determine that the transaction card is likely in the user's possession. In some embodiments, the financial monitoring system 12 may continuously check whether the threshold duration is exceeded.

Conversely, if the duration of separation exceeds the threshold duration, the financial monitoring system 12 may send, at block 124, a notification to the user 16 via the mobile device 20 or other suitable device indicating that the credit card may be misplaced. In some embodiments, the notification, when received by a respective device, may cause the device to automatically execute an application or program regardless of whether the application or program was currently active. In this way, the application or program may provide a visual, haptic, audible, or other suitable notification that may allow a respective user to become aware of the duration of separation. Additionally, the notification may include a prompt for the user 16 to confirm or deny that the user 16 is in possession of the transaction card. If the financial monitoring system 12 does not receive a possession confirmation from the user 16, then the financial monitoring system 12 may perform additional mitigating measures, including aborting the transaction and freezing the transaction card.

By way of example, the financial monitoring system 12 may determine that a credit card is likely in the user's possession based on an RFID reader receiving an authentication reply from an RFID tag associated with the credit card. However, if the card-tracking device does not receive the authentication reply from the RFID tag within a threshold amount of time, then the card-tracking device may determine that the transaction card may be lost and alert the user 16. That is, the user 16, having taken the credit card out of the smart wallet to make a purchase, may forget to return the credit card to the smart wallet. Then, the smart wallet, after waiting the threshold amount of time to receive an authentication reply from the credit card, may generate a notification to the user 16 indicating that the credit card may be misplaced.

By performing the techniques described herein, the financial monitoring system 12 may provide improved methods for mitigating fraud related to unusual gratuity payments. Indeed, the financial monitoring system 12 may generate a gratuity model based on input data collected from a variety of computing systems and data sources associated with a user. That is, the input data may be used to train the gratuity model to predict an expected gratuity amount. Moreover, the financial monitoring system 12 may detect trigger data to activate collection of updated input data. Then, the financial monitoring system 12 may use the gratuity model to detect fraud based on the updated input data. Furthermore, the financial monitoring system 12 may send an alert to the user and a financial entity indicative of possible fraud.

Moreover, the present embodiments described herein allow the financial monitoring system 12 to monitor the presence of a transaction card with respect to a card-tracking device. For instance, the card-tracking device may employ NFC techniques to detect whether and for how long the transaction card is within a certain proximity of the card-tracking device. A duration of separation between the transaction card and the card-tracking device may be part of the input data for the gratuity model. Furthermore, if the transaction card and the card-tracking device are separated for a period of time exceeding a threshold duration, the financial monitoring system 12 may send a notification to the user regarding potential dispossession of the transaction card.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system comprising:

a point of sale device configured to facilitate a transaction; and a processing system configured to perform operations comprising:

detecting trigger data indicative of the transaction expected to occur within a time period, wherein the transaction is associated with a user, wherein the trigger data corresponds to an indication that a vehicle system of a vehicle is activated, one or more search terms are entered into a navigation system of the vehicle, the vehicle is located within a proximity to a location, or any combination thereof;

receiving a gratuity model associated with the user in response to detecting the trigger data, wherein the gratuity model is representative of a plurality of expected gratuity amounts corresponding to a plurality of transaction types, and wherein the gratuity model is generated based on:

one or more first correlations between one or more amounts of time that the user is positioned in one or more first locations and one or more gratuity amounts, wherein the one or more amounts of time are determined based on a first set of location data received from one or more location sensors associated with a mobile device corresponding to the user; and one or more second correlations between one or more second locations of the mobile device and one or more values of one or more properties corresponding to the one or more second locations, wherein the one or more second locations are determined based on a second set of location data received from the one or more location sensors;

receiving, from the point of sale device, transaction data associated with the transaction, wherein the transaction data comprises an actual gratuity amount associated with the transaction;

determining an expected gratuity amount based on the gratuity model, an amount of time that the user was located at a location corresponding to the transaction data, and the location, wherein the amount of time and the location are determined based on a third set of location data acquired by the one or more location sensors; and generating an alert indicative of unexpected financial activity in response to the actual gratuity amount deviating from the expected gratuity amount by a threshold amount, wherein the alert is presented via an electronic display;

sending a command to a financial system associated with the transaction to abort the transaction in response to receiving the actual gratuity amount deviating from the expected gratuity amount by the threshold amount; and updating the gratuity model based on data associated with the transaction in response to the actual gratuity amount not deviating from the expected gratuity amount by the threshold amount.

2. The system of claim 1, wherein the processing system is configured to perform additional operations comprising displaying a prompt requesting user confirmation of the actual gratuity amount in response to the actual gratuity amount deviating from the expected gratuity amount by the threshold amount.

3. The system of claim 2, wherein the additional operations comprise sending a command to a financial system associated with the transaction to abort the transaction in response to receiving user disconfirmation of the actual gratuity amount.

4. The system of claim 2, wherein the additional operations comprise updating the gratuity model based on the actual gratuity amount in response to the user confirmation of the actual gratuity amount.

5. The system of claim 1, wherein the gratuity model is generated using a machine learning model trained on previous transaction data associated with one or more previous transactions associated with the user and contextual data associated with each of the one or more previous transactions.

6. The system of claim 5, wherein the operations comprise receiving additional contextual data associated with the transaction in response to detecting the trigger data, wherein the expected gratuity amount is determined based on the additional contextual data.

7. The system of claim 6, wherein the additional contextual data comprises at least one of biometric data, internet activity data, vehicle system data, and calendar data.

8. The system of claim 6, wherein the additional contextual data comprises data indicative of a proximity between a user device and a transaction card associated with the transaction.

9. A method comprising:

detecting, via a processing system, trigger data indicative of a transaction expected to occur within a time period, wherein the transaction is associated with a user, wherein the trigger data corresponds to an indication that a vehicle system of a vehicle is activated, one or more search terms are entered into a navigation system of the vehicle, the vehicle is located within a proximity to a location, or any combination thereof;

receiving, via the processing system, a gratuity model associated with the user in response to detecting the trigger data, wherein the gratuity model is representative of a plurality of expected gratuity amounts corresponding to a plurality of transaction types, and wherein the gratuity model is generated based on:

one or more first correlations between one or more amounts of time that the user is positioned in one or more first locations and one or more gratuity amounts, wherein the one or more amounts of time are determined based on a first set of location data received from one or more location sensors associated with a mobile device corresponding to the user; and one or more second correlations between one or more second locations of the mobile device and one or more values of one or more properties corresponding to the one or more second locations, wherein the one or more second locations are determined based on a second set of location data received from the one or more location sensors;

receiving, via the processing system, transaction data associated with the transaction;

determining, via the processing system:

an actual gratuity amount based on the transaction data; and an expected gratuity amount based on the gratuity model, an amount of time that the user was located at a location corresponding to the transaction data, and the location, wherein the amount of time and the location are determined based on a third set of location data acquired by the one or more location sensors; and generating, via the processing system, an alert indicative of unexpected financial activity in response to the actual gratuity amount deviating from the expected gratuity amount by a threshold amount, wherein the alert is presented via an electronic display;

sending, via the processing system, a command to a financial system associated with the transaction to abort the transaction in response to receiving the actual gratuity amount deviating from the expected gratuity amount by the threshold amount; and updating, via the processing system, the gratuity model based on data associated with the transaction in response to the actual gratuity amount not deviating from the expected gratuity amount by the threshold amount.

10. The method of claim 9, comprising displaying, via the processing system, a prompt requesting user confirmation of the actual gratuity amount in response to the actual gratuity amount deviating from the expected gratuity amount by the threshold amount.

11. The method of claim 10, comprising sending, via the processing system, a command to a financial system associated with the transaction to abort the transaction in response to receiving user disconfirmation of the actual gratuity amount.

12. The method of claim 10, comprising updating, via the processing system, the gratuity model based on the actual gratuity amount in response to the user confirmation of the actual gratuity amount.

13. The method of claim 9, wherein the gratuity model is generated using a machine learning model trained on previous transaction data associated with one or more previous transactions associated with the user and contextual data associated with each of the one or more previous transactions.

14. One or more tangible, non-transitory, computer readable media containing instructions that, when executed by a processing system, cause the processing system to:

detect trigger data indicative of a transaction expected to occur within a time period, wherein the transaction is associated with a user, wherein the trigger data corresponds to an indication that a vehicle system of a vehicle is activated, one or more search terms are entered into a navigation system of the vehicle, the vehicle is located within a proximity to a location, or any combination thereof;

receive a gratuity model associated with the user in response to detecting the trigger data, wherein the gratuity model is representative of a plurality of expected gratuity amounts corresponding to a plurality of transaction types, and wherein the gratuity model is generated based on:

one or more first correlations between one or more amounts of time that the user is positioned in one or more first locations and one or more gratuity amounts, wherein the one or more amounts of time are determined based on a first set of location data received from one or more location sensors associated with a mobile device corresponding to the user; and one or more second correlations between one or more second locations of the mobile device and one or more values of one or more properties corresponding to the one or more second locations, wherein the one or more second locations are determined based on a second set of location data received from the one or more location sensors;

receive transaction data associated with the transaction;

determine an actual gratuity amount based on the transaction data and an expected gratuity amount based on the gratuity model, an amount of time that the user was located at a location corresponding to the transactions data, and the location, wherein the amount of time and the location are determined based on a third set of location data acquired by the one or more location sensors; and generate an alert indicative of unexpected financial activity in response to the actual gratuity amount deviating from the expected gratuity amount by a threshold amount, wherein the alert is presented via an electronic display;

send a command to a financial system associated with the transaction to abort the transaction in response to receiving the actual gratuity amount deviating from the expected gratuity amount by the threshold amount; and update the gratuity model based on data associated with the transaction in response to the actual gratuity amount not deviating from the expected gratuity amount by the threshold amount.

15. The one or more tangible, non-transitory computer-readable media of claim 14, wherein the instructions, when executed by a processing system, cause the processing system to display, via an electronic display device, a prompt requesting user confirmation of the actual gratuity amount in response to the actual gratuity amount deviating from the expected gratuity amount by the threshold amount.

16. The one or more tangible, non-transitory computer-readable media of claim 15, wherein the instructions, when executed by a processing system, cause the processing system to send a command to a financial system associated with the transaction to abort the transaction in response to receiving user disconfirmation of the actual gratuity amount.

17. The one or more tangible, non-transitory computer-readable media of claim 15, wherein the instructions, when executed by a processing system, cause the processing system to update the gratuity model based on the actual gratuity amount in response to the user confirmation of the actual gratuity amount.

18. The one or more tangible, non-transitory computer-readable media of claim 15, wherein the gratuity model is generated using a machine learning model trained on previous transaction data associated with one or more previous transactions associated with the user and contextual data associated with each of the one or more previous transactions.

* * * * *